(12) United States Patent
Ellam

(10) Patent No.: US 11,394,730 B2
(45) Date of Patent: *Jul. 19, 2022

(54) ACTIVITY DETECTION BASED ON TIME DIFFERENCE METRICS

(71) Applicant: HEWLETT-PACKARD DEVELOPMENT COMPANY, L.P., Spring, TX (US)

(72) Inventor: Daniel Cameron Ellam, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,581

(22) Filed: Jun. 2, 2021

(65) Prior Publication Data

US 2021/0288982 A1 Sep. 16, 2021

Related U.S. Application Data

(63) Continuation of application No. 16/077,694, filed as application No. PCT/US2017/042390 on Jul. 17, 2017, now Pat. No. 11,128,643.

(51) Int. Cl.
*H04L 9/40* (2022.01)
*G06F 21/55* (2013.01)
*H04L 41/0681* (2022.01)
*H04L 41/142* (2022.01)
*H04L 41/147* (2022.01)

(52) U.S. Cl.
CPC ........ *H04L 63/1416* (2013.01); *G06F 21/552* (2013.01); *H04L 41/0681* (2013.01); *H04L 41/142* (2013.01); *H04L 41/147* (2013.01)

(58) Field of Classification Search
CPC ............. H04L 63/1416; H04L 63/1425; H04L 41/142
See application file for complete search history.

(56) References Cited

U.S. PATENT DOCUMENTS

| 7,418,733 | B2 | 8/2008 | Connary |
| 9,591,007 | B2 | 3/2017 | Hu et al. |
| 9,985,980 | B1 * | 5/2018 | Koi ...................... H04L 63/1416 |

(Continued)

OTHER PUBLICATIONS

Shalaginov, A. et al., Malware Beaconing Detection by Mining Large-scale DNS Logs for Targeted Attack Identification, 2016 http://waset.org./publications/10004242/malware-beaconing-detection-by-mining-large-scale-dns-logs-for-targeted-attack-identification > (13 pages).

(Continued)

*Primary Examiner* — Nicholas P Celani
(74) *Attorney, Agent, or Firm* — HP Inc. Patent Department

(57) ABSTRACT

In some examples, a system determines a difference between a received time indication and a previous time indication, performs a modular arithmetic operation with respect to a first integer on the difference, and increments a count related to a first set associated with a first result of the modular arithmetic operation. The system compares respective counts associated with respective sets of a plurality of sets including the first set, wherein each set of the plurality of sets is associated with a different result of the modular arithmetic operation, and detects an occurrence of a security intrusion based on the comparison.

20 Claims, 5 Drawing Sheets

(56) References Cited

U.S. PATENT DOCUMENTS

| | | |
|---|---|---|
| 11,128,643 B2* | 9/2021 | Ellam .................. G06F 21/552 |
| 2006/0075093 A1 | 4/2006 | Frattura |
| 2008/0215355 A1 | 9/2008 | Herring |
| 2010/0030544 A1 | 2/2010 | Gopalan |
| 2013/0114894 A1 | 5/2013 | Yadav |
| 2013/0347114 A1 | 12/2013 | Altman et al. |
| 2016/0066346 A1 | 3/2016 | Azad |
| 2016/0323811 A1 | 11/2016 | Lepp et al. |
| 2016/0330689 A1 | 11/2016 | Park |
| 2017/0070527 A1* | 3/2017 | Bailey .................... H04L 67/30 |
| 2017/0244731 A1* | 8/2017 | Hu ...................... H04L 63/1425 |
| 2017/0339184 A1 | 11/2017 | Bailey |

OTHER PUBLICATIONS

Vanbuskirk, "Advanced Methods to Detect Advanced Cyber Attacks: Beacon", Nov. 17, 2014 <https://www.novetta.com/2014/11/advanced-methods-to-detect-advanced-cyber-attacks-beacon/> (5 pages).

* cited by examiner

| MOD 3 OPERATION RESULT | 0 | 1 | 2 |
|---|---|---|---|
| COUNT | 26 | 23 | 26 |

400

| MOD 7 OPERATION RESULT | 0 | 1 | 2 | 3 | 4 | 5 | 6 |
|---|---|---|---|---|---|---|---|
| COUNT | 11 | 12 | 8 | 11 | 12 | 10 | 11 |

401

| MOD 11 OPERATION RESULT | 0 | 1 | 2 | 3 | 4 | 5 | 6 | 7 | 8 | 9 | 10 |
|---|---|---|---|---|---|---|---|---|---|---|---|
| COUNT | 6 | 7 | 6 | 7 | 7 | 7 | 4 | 7 | 9 | 8 | 8 |

402

| MOD 13 OPERATION RESULT | 0 | 1 | 2 | 3 | 4 | 5 | 6 | 7 | 8 | 9 | 10 | 11 | 12 |
|---|---|---|---|---|---|---|---|---|---|---|---|---|---|
| COUNT | 5 | 8 | 7 | 7 | 7 | 6 | 8 | 5 | 4 | 5 | 4 | 5 | 5 |

403

| MOD 17 OPERATION RESULT | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| COUNT | 5 | 5 | 6 | 5 | 6 | 3 | 5 | 4 | 5 | 4 | 4 | 4 | 3 | 4 | 5 | 4 | 4 |

404

MOD 3 SET: RANGE = 3; INDEX OF DISPERSION = .08

MOD 7 SET: RANGE = 4; INDEX OF DISPERSION = .152

MOD 11 SET: RANGE = 5; INDEX OF DISPERSION = .222

MOD 13 SET: RANGE = 4; INDEX OF DISPERSION = .312

MOD 17 SET: RANGE = 3; INDEX OF DISPERSION = .161

ACTIVITY DETECTION BASED ON TIME DIFFERENCE METRICS

CROSS REFERENCE TO RELATED APPLICATIONS

This is a continuation of U.S. application Ser. No. 16/077,694, having a national entry date of Aug. 13, 2018, which is a national stage application under 35 U.S.C. § 371 of PCT/US2017/042390, filed Jul. 17, 2017, which are both hereby incorporated by reference in their entirety.

BACKGROUND

Periodic communications or electronic device events may be indicative of security related or other activity. As an example, communications between devices related to malware and other security activity may involve a pattern of communication. In some cases, malware may run on an electronic device and communicate with a malware operator, such as a command and control center. The communications between the malware operator and malware may involve transmitting instructions to the malware from the malware operator and/or transmitting data from the malware to the malware operator.

BRIEF DESCRIPTION OF THE DRAWINGS

The drawings describe example embodiments. The following detailed description references the drawings, wherein:

FIG. 4 is a diagram illustrating one example of comparing metrics related to differences in sets related to time differences.

DETAILED DESCRIPTION

Figure 1:
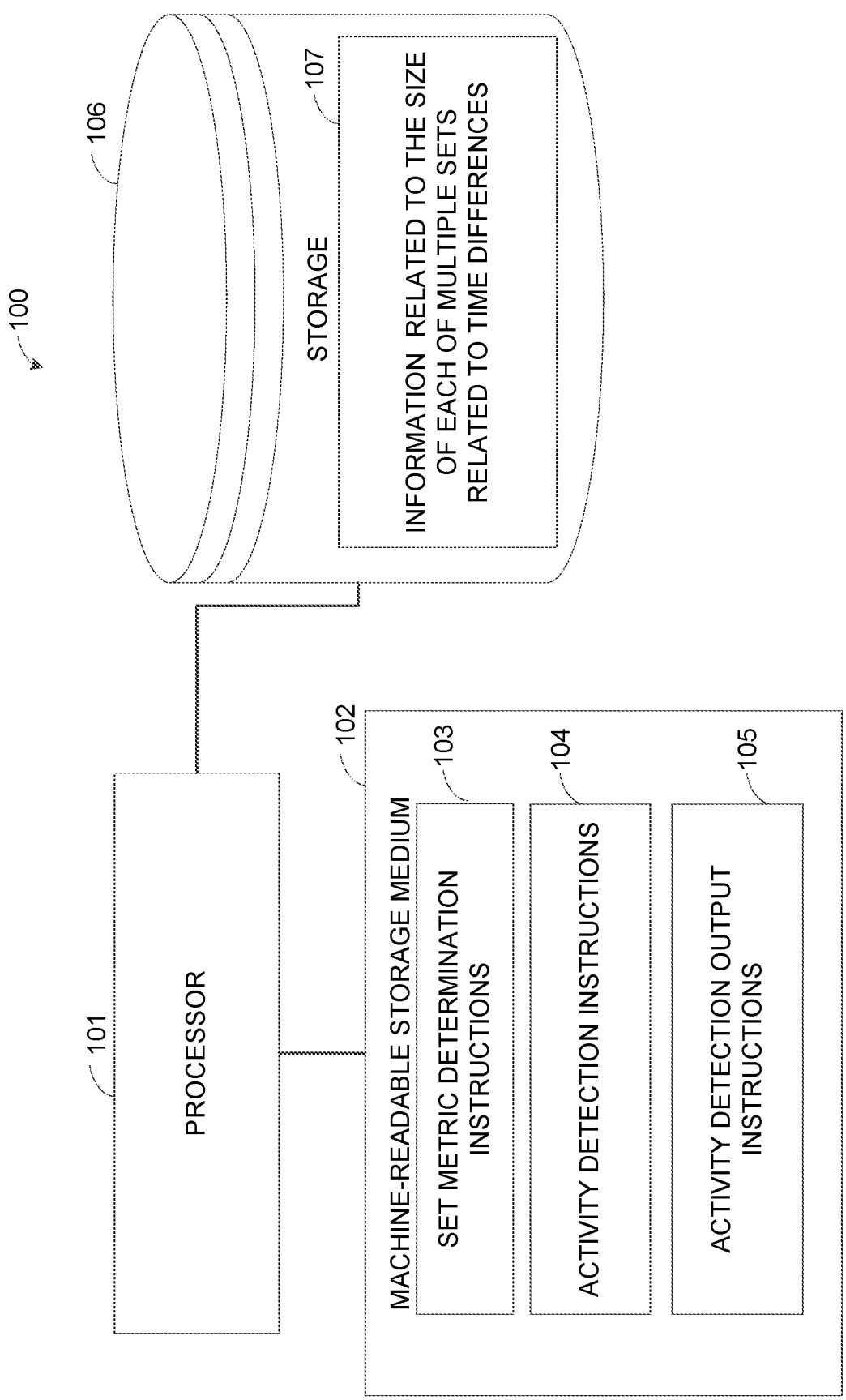
FIG. 1 is a block diagram illustrating one example of a computing system to detect an activity based on time difference metrics.

In one implementation, a computing system detects an activity based on a modulus operation applied to temporal data. For example, a processor may determine a difference between a received time stamp and a previous time stamp and perform a modular arithmetic operation on the difference between the time stamps. The processor may compare metrics associated with multiple sets where each set is associated with a different result of the modular operations. The processor may detect the occurrence of an activity, such as a security related activity, based on the comparison.

Applying a modulus operation to compare temporal data may provide advantages related to speed and storage capacity. For example, the individual time stamps and differences in some implementations may not be stored, and the stored information may be limited to an initial time stamp and sizes of the sets associated with the modular results. The amount of processing used to update the system for each incoming event and associated time stamp may be limited to an operation related to the initial time stamp such that other time stamps are not considered and compared to the incoming time information. For example, the method may allow for real time comparisons to be made without storing all previous temporal data. In some cases, real time comparisons may be more desirable than batch processing event log information.

In one implementation, security activity, such as malware beaconing, may be detected based on a detection of a regular communication pattern likely to represent malware communication to a command and control center. For example, a beaconing pattern may be less sporadic than regular traffic and may occur at regular intervals. The sets associated with each modular result may fill up more evenly when beaconing traffic occurs as compared to sporadic typical network traffic. Using a modulus operation may make a detection system less sensitive to gaps in beaconing activity, such as due to latency or powering down a machine, and a modulus operation may allow a pattern to be detected even where a pattern changes.

As another example, a modular operation may be applied to temporal data in any suitable manner to detect a security incident. For example, the temporal data may be used to detect CPU usage activity indicative of malware, such as where CPU activity occurs in more regular intervals. In such cases, a modular operation method may be used to detect CPU usage anomalies and other activity related to an electronic device. In one implementation, a modular operation may be applied to temporal data associated with periodic system calls indicative of malware, such as where the malware performs certain routines and system checks at regular intervals. In one implementation, the method may be used to analyze temporal data associated with code downloading indicated by periodic memory assignments of a nearly fixed size to accommodate the shell-code downloaded by the malware. Other malware indicators that may be analyzed for periodic occurrences may include, for example, disk reads and/or writes, GPU activity, and thread creation.

FIG. 1 is a block diagram illustrating one example of a computing system to detect an activity based on time difference metrics. The computing system 100 may analyze communication information to determine if a pattern in the communication information indicates a high likelihood of a particular activity type, such as malware communication. The computing system 100 includes a processor 101, machine-readable storage medium 102, and storage 106.

The storage 106 may be any suitable storage accessible to the processor 101 to store and/or retrieve data. In one implementation, the processor 101 communicates with the storage 106 via a network. The storage 106 and the machine-readable storage medium 102 may be included in the same or separate electronic devices. The storage 106 may store information 107 related to the size of each of multiple sets related to time differences. The information 107 may include information about the number of time period differences associated with each of the sets. Each set may be related to a different integer, and the size of the associated set may include the number of time indications where the difference between the time indication and first time indication results in the associated set integer when a modular arithmetic operation is performed on the difference.

The time indications may be time stamps or other time information related to a communication or operation of a computing system, such as the computing system 100. In one implementation, the computing system 100 analyzes time indication information from multiple other computing systems. In one implementation, the time indications are related to received network communications, and the storage 106 stores a group of sets for each network domain associated with a received network communication.

In one implementation, the storage 106 also stores information related to a second group of sets such that the second group of sets is related to a modular operation related to a different integer than the integer used for the modular operation applied to the data of the first group of sets.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include set metric determination instructions 103, activity detection instructions 104, and activity detection output instructions 105.

The set metric determination instructions 103 may include instructions to determine information about the spread of the sizes of the sets based on the information 107. For example, the range, dispersion, standard deviation, interquartile range, and/or spike in growth may be compared between the sizes of the different sets.

The activity detection instructions 104 may include instructions to detect an activity based on the determined metric information. A threshold may be compared to the determined metrics such that an activity is detected if a metric is over the threshold and/or a metric may be compared to a range such that the metric value indicates a likelihood of the presence of a particular activity. In one implementation, rules may be associated with an event such that an event is detected if different thresholds or groups of thresholds are reached for different metrics.

The activity detection output instructions 105 may include instructions to output an indication that the event is detected. For example, an alert may be transmitted, stored, or issued.

Figure 2:
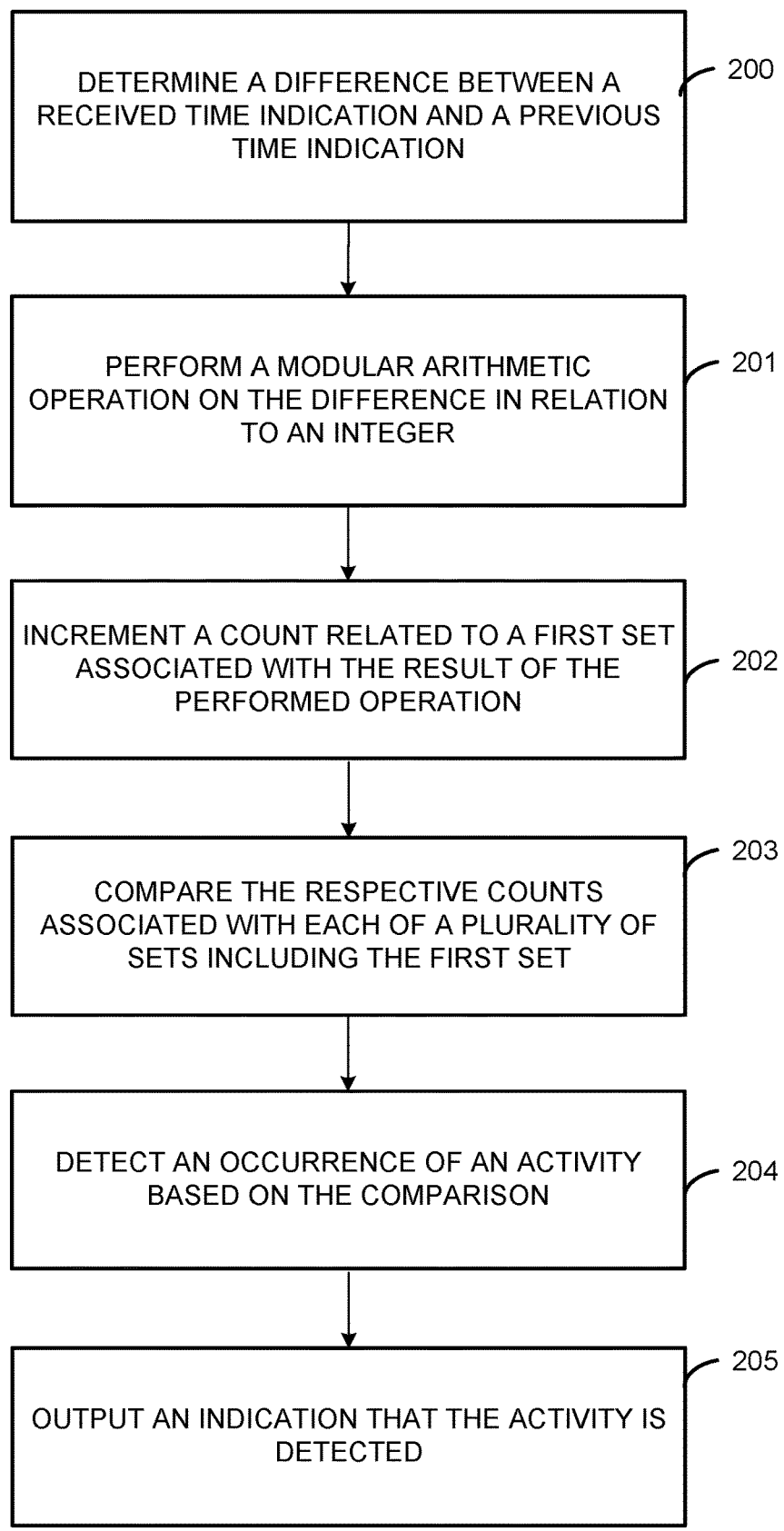
FIG. 2 is a flow chart illustrating one example of a method to detect an activity based on time difference metrics.

FIG. 2 is a flow chart illustrating one example of a method to detect an activity based on time difference metrics. The activity may be any suitable activity, such as activity related to malware or other security intrusion. The method may detect the activity based on an analysis of the regularity of a communication or other time based event. The method may be implemented, for example, by the computing system 100 of FIG. 1.

Beginning at 200, a processor determines a difference between a received time indication and a previous time indication. The difference may be determined in real time when a time indication is received or may be based on stored event logs. The received time indication and previous time indication may be any suitable time indications, such as time stamps. In one implementation, a received time indication is a symbol representative of a time period, and a processor converts the symbol to an integer or time stamp. The previous time indication may be, for example, a first time stamp associated with a tracking period such that subsequent time indications are compared to the first time stamp. In one implementation, the processor converts a time indication prior to determining the difference. For example, a time stamp may be rounded to the nearest second, minute, or hour. The time indications may be associated with any suitable event, such as a communication transmission and/or receipt, or an operation associated with an electronic device.

Continuing to 201, the processor performs a modular arithmetic operation on the difference in relation to an integer. The integer may be a prime number. A prime number may be used in order to increase the likelihood that a majority of the sets will increase with the event occurrences. If the event occurrences are at the same interval as the prime number, then the other sets may not increase, but the event may be detected due to use of multiple groups of sets for different prime numbers. Using multiple prime numbers may also ease detection where there is a gap in the pattern. In some implementations, the integer may be a prime number, but not 5 to increase the likelihood of result sets to increase in size more uniformly. In one implementation, the integer is 3, 7, 11, 13, or 17. As an example, if the time difference between the first time indication and current time indication is 8 and the integer is 7, then the processor may perform 8 mod 7 to result in 1.

Continuing to 202, the processor increments a count related to a first set associated with the result of the performed operation. For example, if the integer is 7, there may be sets associated with the results 0, 1, 2, 3, 4, 5, and 6. If the result of the modular operation, is 1, the size of the set associated with 1 may be incremented by 1.

Continuing to 203, the processor compares the respective counts associated with each of a plurality of sets including the first set. For example, if the integer is 7, and there are sets of different sizes associated with results 0, 1, 2, 3, 4, 5, and 6, the sizes of the 7 different result sets may be compared. The processor may compare the set sizes in any suitable manner, such as by determining the range, dispersion, standard deviation, interquartile range, and/or growth rate between the different set sizes. The range may be determined by the size of the modular result set with the maximum size minus the size of the modular result with the minimum size. The dispersion may be determined based on the variance of the sizes divided by the averages of the sizes. The growth rate comparison metric may involve determining whether there is a spike in growth rate of a set compared to the rate of growth of the other sets.

In one implementation different comparison metrics are used for different modular integer sets. For example, for mod 7 sets the range of the sets may be used, and for mod 13 sets the dispersion of the sets may be used.

Continuing to 204, the processor detects an occurrence of an activity based on the comparison. For example, the processor may compare different size metrics to thresholds. In one implementation, the processor determines that malware is detected if the size differences between the sets indicates a range of less than 9 and an index of dispersion less than 0.51. In one implementation, the same metric is used for different modular sets but with different thresholds associated with the same metric for the different modular sets, such as where a range of less than 8 indicates an event for mod 7 and where a range of less than 12 indicates and event for mod 13. In one implementation, the thresholds indicating an event are based on the number of events observed, such as the number of network observed events. For example, the threshold for 40 observed events may be at least 3 moduli all satisfying range less than 5 and dispersion less than 0.41, the threshold for 200 observed events may be at least 3 moduli all satisfying range less than 9 and dispersion less than 0.5, and the threshold for 600 observed events may be at least 3 moduli all satisfying range less than 14 and dispersion less than 0.61. In one implementation, different moduli metrics are used based on the size of the sets, such as where 17 is not used for sets of less than 40. In one implementation, the processor determines whether a threshold is satisfied if a minimum number of events is reached, such as beginning detection analysis if at least 10 events are input into the system. In one implementation, the processor determines a confidence level based on the number of events and/or the degree to which the event detection thresholds are met.

In one implementation, the processor determines the size of different sets associated with different integers, such as where there is a group of sets associated with a first integer and a group of sets associated with a second integer. For example, the processor may determine metrics associated with the difference in result set sizes for operations mod 7 and determine metrics associated with the difference in result set sizes for operations mod 13.

In one implementation, the thresholds are updated based on the amount of noise in the system. For example, in the case of network traffic, a patterned beaconing signal may access the system and the resulting metrics may be compared to the existing thresholds. A system with less noise may detect an event using lower thresholds.

Continuing to 205, the processor outputs an indication that the activity is detected. For example, the processor may create an audible or visual alert. In one implementation, the processor stores or transmits information related to the detected event. The output may be binary information indicating whether an event is likely, a likelihood of the event occurring, or other information related to the determined metrics. In one implementation, the information about the activity is transmitted, such as to an administrator that may update an electronic device in response. In one implementation, an auction is automatically taken in response to the activity. For example, if malware beaconing activity is detected with respect to a domain, the domain may be automatically blocked.

Figure 3:
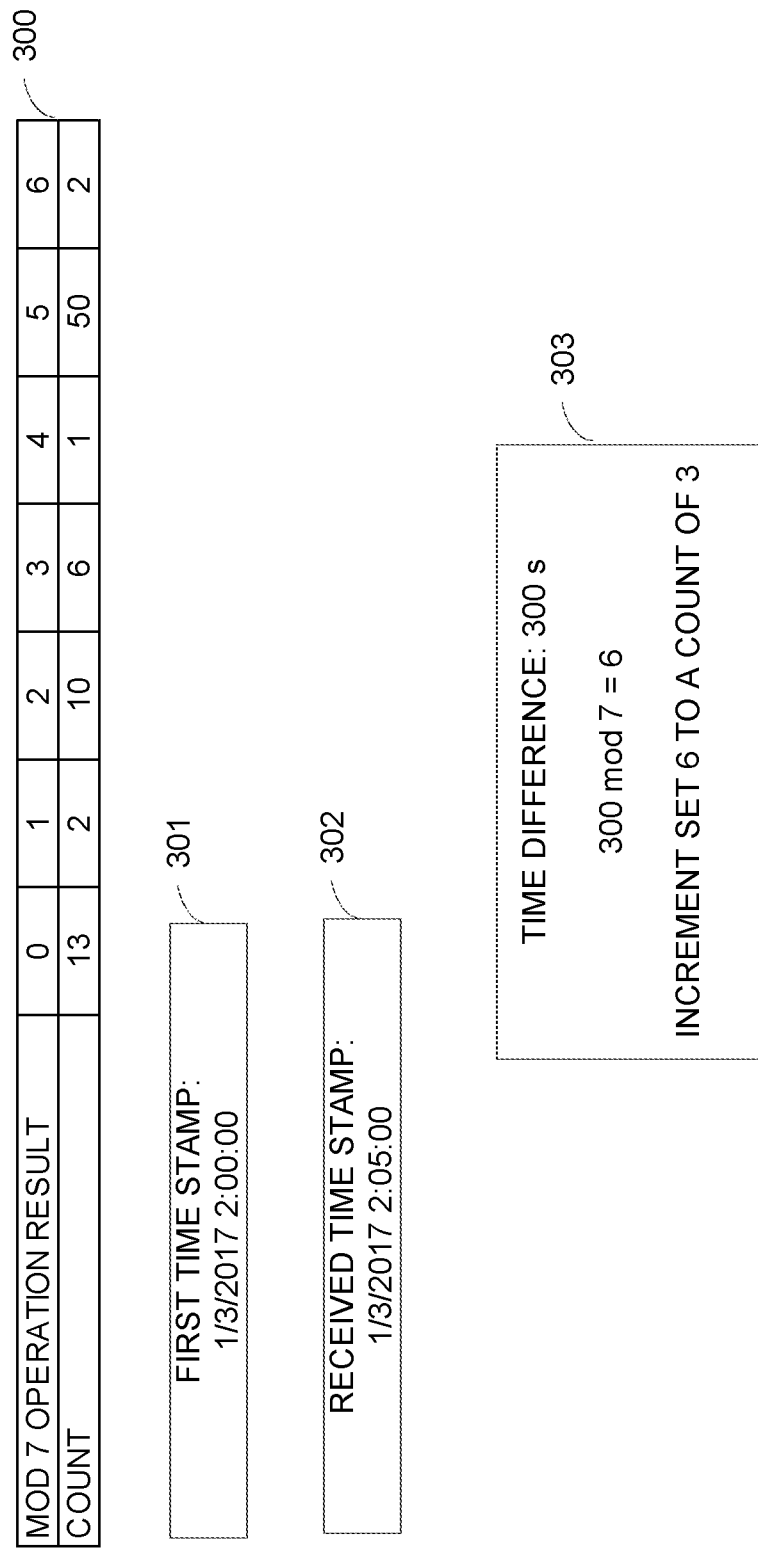
FIG. 3 is a diagram illustrating one example of storing information related to updating the size of a set based on a time difference.

FIG. 3 is a diagram illustrating one example of storing information related to updating the size of a set based on a time difference. Block 300 shows the sets associated with the results of a mod 7 operation and the associated size associated with the sets of each result. For example, the result 0 set has a count of 13 occurrences. Block 301 shows information related to a first time stamp, and block 302 shows information related to a received time stamp. Block 303 illustrates steps taken by a processor to update the set size of block 300 based on the comparison of the time indication in block 301 to 302.

Block 303 shows the time difference between the two time stamps to be 300 seconds. A modular operation using integer 7 is performed such that the result of 300 mod 7 is 6. The processor updates the set size associated with result 6 from 2 to 3 to indicate the difference related to received time stamp information 302.

FIG. 4 is a diagram illustrating one example of comparing metrics related to differences in sets related to time differences. Blocks 400-404 each show a group of sets related to a modular operation with respect to a different integer. For example, block 400 includes the sizes of sets 0, 1, and 2 resulting from a mod 3 operation. Block 405 includes metrics associated with a comparison of the set sizes for each block 400-404. The metrics include range from the minimum to maximum set size for each integer and the index of dispersion for the set size for each integer. A processor may determine the likelihood of an event based on any suitable comparison. For example, the processor may determine a likelihood of malware based on a range or index of dispersion threshold reached in the sets for any of the integers. In one implementation, the processor determines information across multiple integers. For example, a process may detect an activity if for three different integers of modular operations the index of dispersion is less than 0.51 and the range is less than 9. In this case, 5 of the 5 integers meet the criteria, and an activity is detected.

Figure 5:
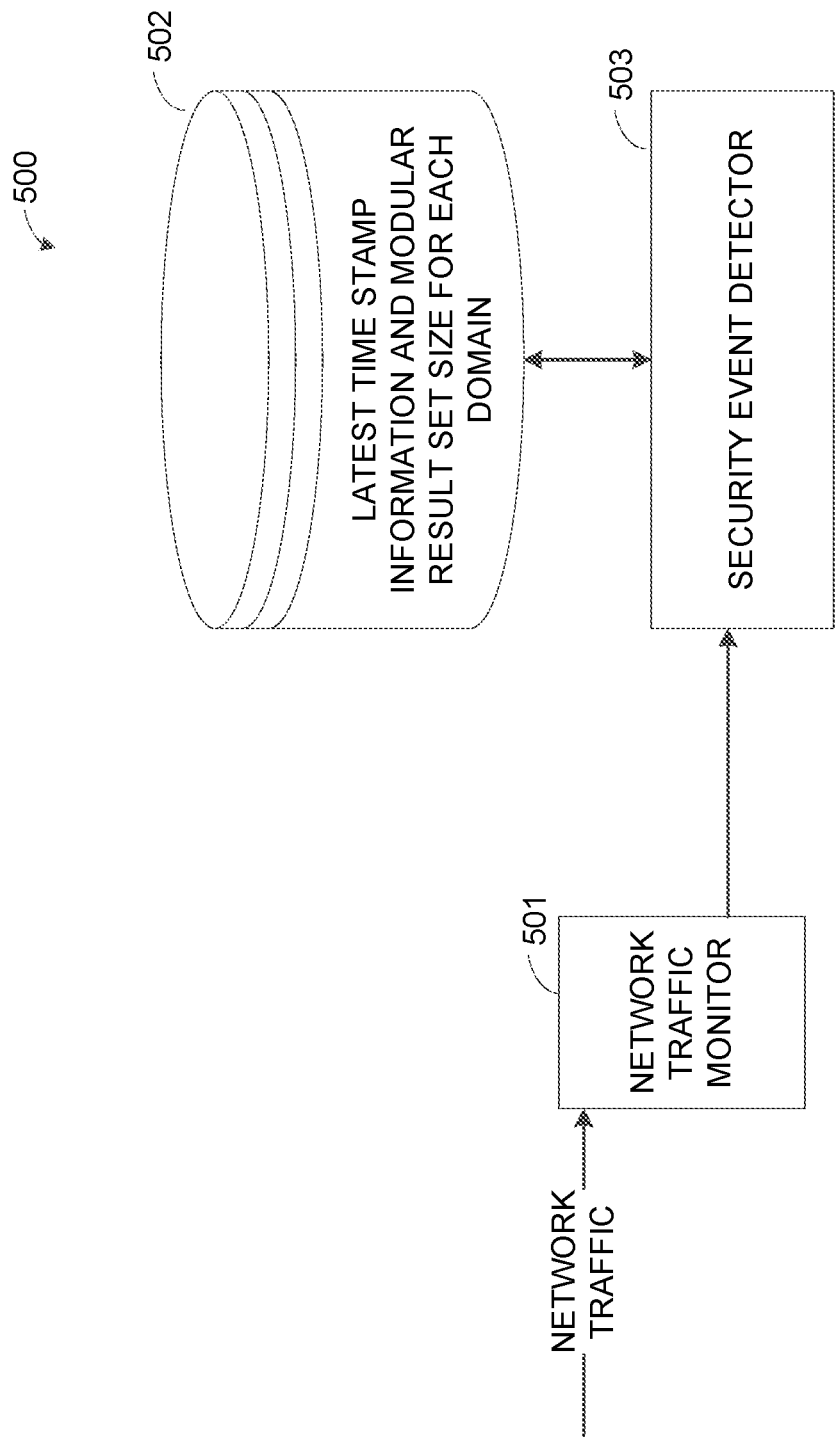
FIG. 5 is a block diagram illustrating one example of a computing system to detect network security activity based on time difference metrics.

FIG. 5 is a block diagram illustrating one example of a computing system 500 to detect network security activity based on time difference metrics. The security activity may be, for example, malware communication to a command and control center. The computing system 500 includes a network traffic monitor 501 to monitor network traffic coming into the computing system to determine if it is representative of malware beaconing traffic. The computing system 500 or components of the computing system 500 may be deployed at an endpoint or a network routing device. The network traffic monitor 501 may monitor domain information and time information associated with packets received by and/or sent from the computing system 500. The network traffic monitor 501 may analyze metadata associated with network traffic to extract domain information and time stamp information. In some implementations, the network traffic monitor 501 may extract subdomain information. When a new connection is made, the network traffic monitor 501 may store information in the storage 501 related to a new domain and may store the associated time indication as the initial time indication associated with the domain. If a previously accessed domain is accessed subsequently, the network traffic monitor 501 may store information about the access in the storage 502. In one implementation, the network traffic monitor 501 analyzes stored network logs such that the network traffic is not processed in real time.

The storage 502 may store latest time stamp information and modular set counts for each domain. For example, the storage 502 may store sets related to results of modular operations associated with a difference between a received time stamp associated with traffic from a domain compared to a first received or initial tracking time stamp associated with the same domain.

The security event detector 503 may analyze the information related to the time differences associated with each network domain from which network traffic is transmitted and/or received. For example, if a threshold is met related to metrics of set size differences associated with the modular operation results for a particular domain, the domain may be flagged as a potential malware command and control center. The metrics may be related to, for example, spread comprises at least one of: range, dispersion, standard deviation, interquartile range, and/or comparative spike in growth.

In one implementation, pre-processing is performed such that a white list of unsuspicious domains is not analyzed by the security event detector 503. In one implementation, sub-domains are analyzed together with the domain such that connections to a sub-domain are used to increase the sets associated with the domain.

In one implementation, the security event detector 503 stores information related to a latest time stamp associated with traffic associated with the first domain and receives information related to network traffic from the first domain and associated time stamp information from the network traffic analyzer 501. The security event detector 503 may perform a modular operation on the difference between the received time stamp and the latest time stamp and increment the count of the set associated with the integer of the result of the performed operation. The result is stored in the storage 502 for use in determining metrics associated with the set related to the domain. The security event detector 503 may analyze the stored information in the storage 502 to detect an activity based on a comparison of the differences in sizes associated with the modular results for a particular domain. The activity detection may occur for a particular domain each time a new time stamp is receive associated with the domain and/or at a particular interval. Using a modular operation on temporal operations may allow for an activity detection system to operate more quickly and with smaller storage capacity.

What is claimed is:

1. A computing system, comprising:
   a processor; and
   a non-transitory storage medium storing instructions executable on the processor to:
   determine a difference between a received time indication and a previous time indication;
   perform a modular arithmetic operation with respect to a first integer on the difference;
   increment a count related to a first set associated with a first result of the modular arithmetic operation;
   compare respective counts associated with respective sets of a plurality of sets including the first set, wherein each set of the plurality of sets is associated with a different result of the modular arithmetic operation; and
   detect an occurrence of a security intrusion based on the comparison.

2. The computing system of claim 1, wherein the received time indication and the previous time indication are related to an event of at least one of a communication or an operation of an electronic device.

3. The computing system of claim 1, wherein the first integer is a prime number.

4. The computing system of claim 3, wherein the prime number is selected from among 3, 7, 11, 13, or 17.

5. The computing system of claim 1, wherein the instructions are executable on the processor to:
   determine a further difference between a further received time indication and a further previous time indication;
   perform a further modular arithmetic operation with respect to the first integer on the further difference; and
   increment a count related to a second set, of the plurality of sets, associated with a second result of the modular arithmetic operation, the second result being different from the first result.

6. The computing system of claim 1, wherein the instructions are executable on the processor to:
   compute, according to the comparison, a range based on the respective counts,
   wherein the detecting of the occurrence of the security intrusion is based on the range.

7. The computing system of claim 1, wherein the detecting of the occurrence of the security intrusion comprises detecting malware activity.

8. The computing system of claim 1, wherein the detecting of the occurrence of the security intrusion is based on the comparison indicating a range of the respective counts being less than 9, and an index of dispersion of the respective counts being less than 0.51.

9. The computing system of claim 1, wherein the detecting of the occurrence of the security intrusion is further based on a comparison of respective counts associated with a plurality of second sets related to a modular arithmetic operation performed with respect to a second integer different from the first integer.

10. The computing system of claim 9, wherein the first integer and the second integer are different prime numbers.

11. The computing system of claim 1, wherein the comparison comprises at least one of range, dispersion, standard deviation, interquartile range, or relative spike in growth.

12. A method of a system comprising a hardware processor, comprising:
    determining a difference between a received time indication and a previous time indication;
    performing a modular arithmetic operation with respect to a first integer on the difference;
    incrementing a count related to a first set associated with an integer result of the modular arithmetic operation;
    comparing respective counts associated respective sets of a plurality of sets including the first set, wherein each set of the plurality of sets is associated with a different integer result of the modular arithmetic operation; and
    detecting an occurrence of a security intrusion based on the comparison.

13. The method of claim 12, wherein the first integer is a prime number.

14. The method of claim 13, wherein the prime number is selected from among 3, 7, 11, 13, and 17.

15. The method of claim 12, wherein the detecting of the occurrence of the security intrusion is based on the comparison indicating a range of less than 9 and an index of dispersion less than 0.51 between the respective counts.

16. The method of claim 12, wherein the detecting of the occurrence of the security intrusion is further based on a comparison of respective counts associated with a plurality of second sets related to a modular arithmetic operation performed with respect to a second integer different from the first integer.

17. A non-transitory machine-readable storage medium comprising instructions that upon execution cause a system to:
    determine a difference between a received time indication and a previous time indication;
    perform a modular arithmetic operation with respect to a first integer on the difference;
    increment a count related to a first set associated with a first result of the modular arithmetic operation;
    determine metrics based on respective counts associated with respective sets of a plurality of sets including the first set, wherein each set of the plurality of sets is associated with a different result of the modular arithmetic operation; and
    detect an occurrence of a security intrusion based on the metrics.

18. The non-transitory machine-readable storage medium of claim 17, wherein the metrics comprise a range based on the respective counts.

19. The non-transitory machine-readable storage medium of claim 17, wherein the metrics comprise a dispersion or standard deviation based on the respective counts.

20. The non-transitory machine-readable storage medium of claim 17, wherein the metrics comprise a growth rate based on the respective counts.

* * * * *